March 16, 1937.                  W. WILLIAMSON                  2,074,245
                              HIGH PRESSURE AIR VALVE
                                Filed June 16, 1936
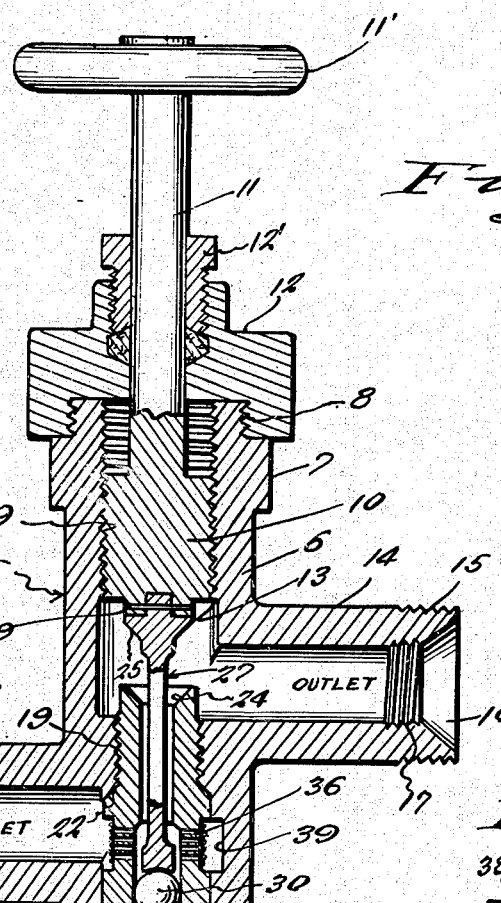
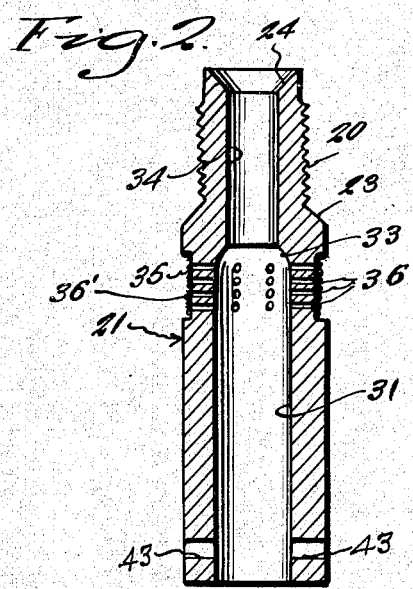
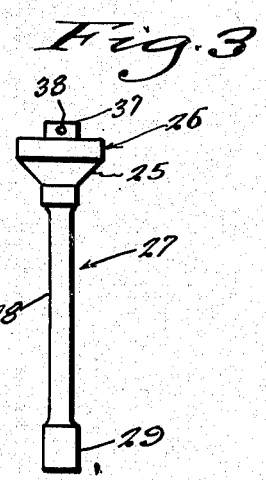
Inventor
William Williamson
By Clarence A. O'Brien and
Hyman Berman
Attorneys Patented Mar. 16, 1937

2,074,245

UNITED STATES PATENT OFFICE 2,074,245

HIGH PRESSURE AIR VALVE

William Williamson, Tiverton, R. I.

Application June 16, 1936, Serial No. 85,609

2 Claims. (Cl. 277—27)

My invention relates generally to high pressure valves, and particularly to a high pressure air valve, and an important object of the invention is to provide a practical and economical valve of this character which will easily handle high air pressures.

Another important object of my invention is to provide a valve of the character indicated which has a double cut-off which takes effect when the valve is worked in either direction to its full limits of travel.

Another important object of my invention is to provide a valve of the character indicated which has those parts which are subjected to wear readily replaceable at low cost, so as to maintain the necessary upkeep at the lowest possible level.

Another important object of the invention is to provide in a valve of the character indicated a valve cage which includes a strainer arrangement which is very easily cleaned and which eliminates the cost of providing a separate strainer.

Another important object of my invention is to provide in a valve of the character indicated an arrangement wherein the pressure is on parts other than the operating stem, so that the valve can be readily opened and closed despite being at work on extremely high pressures.

Other important objects of my invention will be apparent from a reading of the following description in connection with the drawing, wherein for purposes of illustration I have shown a preferred embodiment of my invention.

In the drawing:—

Figure 1 is a general transverse vertical sectional view taken through the embodiment.

Figure 2 is a transverse vertical sectional view taken through the combination valve cage and strainer.

Figure 3 is a side elevational view of the pilot stem.

Referring in detail to the drawing, the body or casing of the valve is generally designated by the numeral 5 and includes the elongated tubular portion 6 which has adjacent one end the shoulder 7 and axially outwardly of this a reduced right hand threaded portion 8. The bore of this end of the tube 6 is provided with a left hand thread as indicated by the numeral 9 to threadedly and rotatably receive the body 10 of the operating stem 11 which is provided on its outer end with an operating wheel 12. The smooth portion of the stem works through a hexagonal nut 12 which is threaded on the reduced threaded portion 8.

The threaded bore portion 9 terminates at the point indicated by the numeral 13 and slightly below this point the valve casing is provided with a reduced lateral tubular branch 14 which is externally threaded as indicated by the numeral 15 at its axially outward end and provided interiorly with a flared mouth 16 and threads 17 acting as adapter means.

Below the branch 14 and extending from a diametrically opposite position on the valve casing is another lateral branch 18 which is similar to the branch 14.

A reduced bore portion 19 establishing communication between the interior of the branch 14 and the interior of the branch 18 has threadedly mounted therein the upper threaded portion 20 of the valve cage which is generally designated 21 and is shown individually in Figure 2. The lower end of the threaded bore portion 19 is provided with a flared seat 22 with which is adapted to engage the flared shoulder 23 below the threaded portion 20 on the valve cage. The upper end of the valve cage is provided interiorly with a flared seat 24 with which the flared portion 25 on the head 26 of the pilot stem is adapted to engage for valve closing purposes.

The pilot stem which is generally designated 27 includes the head 26 already mentioned and the shank or stem 28 which has on its lower end the enlargement 29 in whose lower end is a concavity to cooperate with the surface of a ball 30 which is movably disposed in a smooth bore 31 which extends from an intermediate point of the valve cage 21 and through its lower end. A helical spring 32 disposed in the bore 31 below the ball urges the ball in an upward direction against the pilot stem.

The bore portion 31 terminates in a ball seat 33 at its upper end which leads into a reduced smooth bore portion 34 which opens at its top in the seat 24.

Between the seat 23 of the valve cage and an intermediate portion of the valve cage body is a reduced portion 35 through the walls of which extend radial passages 36 which establish communication between the interior of the valve cage and the exterior thereof. The reduced bore portion 34 is larger than the exterior of the stem portion 28 of the pilot stem. The top of the head 26 of the pilot stem has a lug 37 traversed by an opening 38 which receives a pin 39 which is fastened in lugs depending from the bottom of the valve stem body 10 whereby the pilot stem is swingably connected to the valve operating stem.

As shown in Figure 1, the valve cage when positioned in the valve casing has its threaded portion 20 threaded in the threaded bore 19 and with the beveled seat 23 engaged with the casing seat 22, so that the holes 36 open at one side into the interior of the casing branch 25 and at other sides in an annular passage 39 which is formed in the bore of the lower part of the casing. Below the openings 36 the smooth exterior of the valve cage fits the smooth bore portion 40 of the valve casing and projects therebelow, and this combined valve cage and strainer is confined in position by the nut 41 which is threaded on the threaded lower end 42 of the casing. The lower projecting end portion of the valve cage is provided with transverse openings 43 enabling using a turning tool for extracting the valve cage for replacement and cleaning purposes. It is also to be observed that the removal and replacement of the valve cage is an extremely easy operation involving simply the removal and replacement of the nut 41 and of the valve cage itself by rotating the same into or out of position in the casing. Further, the pressure is on the ball 30 rather than on the stem of the valve and on the body of the cage and on the interior of the valve casing, so that there is no appreciable strain of pressure on the operating parts of the valve, so that the valve may be easily operated either open or closed by rotating the operating wheel 12. A wire mesh screen 36' is sweated around the portion 35.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A high pressure valve of the character indicated comprising an elongated casing provided with a bore open at both ends, one end portion of said bore being interiorly threaded and the opposite end being smooth, a threaded valve operating stem screwed in the interiorly threaded end portion of the bore and including a pilot stem, lateral branches on opposite sides of said casing and constituting an inlet and outlet respectively and communicating with said bore, the mid-portion of the bore lying between the inlet and the outlet being screw threaded, a removable longitudinal valve cage disposed in the smooth portion of said bore and having an externally screw threaded upper end engaged with the screw threaded mid portion of the bore of the casing, said cage having a bore in which said pilot stem is disposed, a spring-pressed ball in the last-mentioned bore and engaged with said pilot, said cage having perforations in its side walls for establishing communication between the inlet of the casing and the bore of the cage, and tap means connected to the casing at the smooth bore end thereof and engaging over said valve cage for holding the spring-pressed ball in place.

2. A high pressure valve of the character indicated comprising an elongated casing provided with a bore, one end portion of said bore being interiorly threaded for reception of a rotatable threaded valve operating stem, a threaded valve operating stem disposed therein and including a swingably connected pilot stem, lateral branches on opposite sides of said casing and constituting an inlet and outlet respectively and communicating with portions of said bore, a removable longitudinal valve cage disposed in another portion of said bore and having a part arranged between said branches so as to control communication of one of said branches with said bore and with the remaining branch, said cage having a bore in which said pilot stem is disposed, a spring-pressed ball in the last-mentioned bore and engaged with said pilot, said cage having perforations in its side walls communicating with one of said branches and with the bore of the cage, a portion of the bore of the casing adjacent one of said branches having a sealing seat, and the cage having a corresponding seat engaged therewith, and said pilot having a seat engageable with a seat in one end of the bore of the cage, thereby establishing a double seal and relieving the operating stem of pressure.

WILLIAM WILLIAMSON.